United States Patent
K

(10) Patent No.: US 12,464,186 B2
(45) Date of Patent: Nov. 4, 2025

(54) CONTEXTUAL CONTENT DELIVERY BASED ON VIEW IN PAUSED SCREEN

(71) Applicant: DISH Network Technologies India Private Limited, Bangaluru (IN)

(72) Inventor: Kunal Kini K, Bangalore (IN)

(73) Assignee: DISH Network Technologies India Private Limited, Bengaluru (IN)

( * ) Notice: Subject to any disclaimer, the term of this patent is extended or adjusted under 35 U.S.C. 154(b) by 0 days.

(21) Appl. No.: 18/395,045

(22) Filed: Dec. 22, 2023

(65) Prior Publication Data

US 2025/0211816 A1    Jun. 26, 2025

(51) Int. Cl.
| | |
|---|---|
| H04N 21/234 | (2011.01) |
| G06Q 30/0251 | (2023.01) |
| G06V 10/00 | (2022.01) |
| H04L 67/306 | (2022.01) |
| H04N 21/262 | (2011.01) |
| H04N 21/2668 | (2011.01) |
| H04N 21/43 | (2011.01) |
| H04N 21/431 | (2011.01) |

(Continued)

(52) U.S. Cl.
CPC ..... *H04N 21/4312* (2013.01); *G06Q 30/0255* (2013.01); *G06V 10/00* (2022.01); *H04L 67/306* (2013.01)

(58) Field of Classification Search
None
See application file for complete search history.

(56) References Cited

U.S. PATENT DOCUMENTS

| | | | |
|---|---|---|---|
| 9,479,803 B2 | 10/2016 | Plotnick et al. | |
| 2009/0317053 A1* | 12/2009 | Morley | H04N 21/658 |
| | | | 725/110 |

(Continued)

FOREIGN PATENT DOCUMENTS

WO    WO 2008072843    6/2008

OTHER PUBLICATIONS directvadvertising.com [online], "Our Solutions—Make Every Pause a Branded Experience," available on or before Mar. 26, 2023, via Internet Archive: Wayback Machine URL <https://web.archive.org/web/20230326022120/https://www.directvadvertising.com/our-solution/pause-ads/>, retrieved on Mar. 14, 2024, URL <https://www.directvadvertising.com/our-solution/pause-ads/>, 5 pages.

(Continued)

*Primary Examiner* — Brian T Pendleton
*Assistant Examiner* — Jean D Saint Cyr
(74) *Attorney, Agent, or Firm* — Fish & Richardson P.C.

(57) ABSTRACT

Methods, systems, and apparatus, including computer programs encoded on computer storage media, for processing information of a paused screen of a video to generate contextual content. The method can include receiving, at one or more computing devices, information indicative of first content associated with a video frame at which a video stream is paused on a user device, identifying, by the one or more computing devices, one or more objects represented in the first content associated with the video frame, obtaining, by the one or more computing devices based on the one or more objects, second content configured to be presented on the user device; and providing the second content for presentation on the user device.

20 Claims, 4 Drawing Sheets

(51) Int. Cl.
*H04N 21/433* (2011.01)
*H04N 21/44* (2011.01)
*H04N 21/475* (2011.01)
*H04N 21/485* (2011.01)
*H04N 21/81* (2011.01)

(56) References Cited

U.S. PATENT DOCUMENTS

| 2010/0153836 A1 | 6/2010 | Krassner et al. |
| 2011/0096143 A1* | 4/2011 | Ono ..................... H04N 23/698 348/E7.001 |
| 2022/0150573 A1* | 5/2022 | Gibbon .............. H04N 21/4316 |

OTHER PUBLICATIONS together.nbc.uni.com [online], "Peacock Pause Ad," available on or before Mar. 22, 2023, via Internet Archive: Wayback Machine URL <https://web.archive.org/web/20230322073148/https://together.nbcuni.com/advertising/peacock/pause-ad/>, retrieved on Mar. 14, 2024, URL <https://together.nbcuni.com/advertising/peacock/pause-ad/>, 4 pages.

\* cited by examiner

CONTEXTUAL CONTENT DELIVERY BASED ON VIEW IN PAUSED SCREEN

BACKGROUND

Video content is often streamed through user-devices such as set-top boxes or mobile devices. Users may interact with such content, for example, by pausing live video, replaying portions, or storing the content for future viewing.

SUMMARY

This specification describes technologies for a system to generate customized content based on information of a video frame, where the video frame is from a video stream paused on a user device. These technologies generally involve the system to generate content customized for a user based on processing information of a paused video stream.

In one aspect, this specification describes methods that include the actions of receiving, at one or more computing devices, information indicative of first content associated with a video frame at which a video stream is paused on a user device, and identifying, by the one or more computing devices, one or more objects represented in the first content associated with the video frame. The methods further include obtaining, by the one or more computing devices based on the one or more objects, second content configured to be presented on the user device, and providing the second content for presentation on the user device.

In another aspect, the specification describes one or more non-transitory computer storage media encoded with computer instructions that when executed by one or more computers cause the one or more computers to perform various operations. The operations include receiving information indicative of first content associated with a video frame at which a video stream is paused on a user device, and identifying one or more objects represented in the first content associated with the video frame. The operations also include obtaining, based on the one or more objects, second content configured to be presented on the user device, and providing the second content for presentation on the user device.

In another aspect, the specification describes a system including a user device and one or more computing devices configured to interact with the user device and to perform operations including receiving, at the one or more computing devices, information indicative of first content associated with a video frame at which a video stream is paused on the user device, and identifying, by the one or more computing devices, one or more objects represented in the first content associated with the video frame. The operations also include obtaining, by the one or more computing devices based on the one or more objects, second content configured to be presented on the user device, and providing the second content for presentation on the user device.

The foregoing and other embodiments can each optionally include one or more of the following features, alone or in combination. In particular, one embodiment includes all the following features in combination.

In some implementations, obtaining the second content includes sending a request based on the one or more objects to a repository of digital content, and in response, receiving, from the repository, the second content. In some implementations, the second content is generated based on a user profile associated with the user device. In some implementations, providing the second content for presentation on the user device includes displaying the second content on the user device. Displaying the second content on the user device can include receiving information indicative of user interaction with the second content, and displaying a webpage based on the information indicative of the user interaction with the second content. In some implementations, obtaining the second content includes determining that the video stream has been paused for a duration that satisfies a threshold duration, and obtaining the second content responsive to determining that the video stream has been paused for the duration that satisfies the threshold duration.

In some implementations, identifying the one or more objects includes identifying a corresponding center score for each of the one or more objects, wherein the center score is indicative of a distance of the corresponding object from the center of the video frame. In some implementations, the method includes determining, for a particular object of the one or more objects, that a corresponding center score satisfies a threshold, in response to determining that the corresponding center score satisfies the threshold, determining a context for the particular object, and storing the context linked to a user profile associated with the user device. In some implementations, determining the context includes determining one or more associations between the particular object and at least another of the one or more objects, and generating the context based on the particular object and the one or more associations. In some implementations, the context includes a respective clarity score that defines a clarity of the one or more objects.

Other embodiments of this aspect include corresponding computer systems, apparatus, and computer programs recorded on one or more computer storage devices, each configured to perform the actions of the methods.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This document describes technology that allows a system to generate customized content based on information of a video frame, where the video frame is from a video stream paused on a user device. For example, if a user pauses streaming video content at a particular frame, a determination may be made that the user has paused the streaming video to inspect an object visible in the particular frame, and accordingly, additional content related to that object may be obtained and displayed as an overlay on the paused frame. For example, if a particular vehicle or an article of clothing is detected to be present in the paused frame, additional customized digital content about the vehicle or article of clothing, respectively, can be provided to the user device for display on the paused screen 106. The customized content can include, for example, additional information on an object or person (e.g., information obtained from an Internet repository such as Wikipedia, IMDB etc.) in the frame at which the video is paused, artificial intelligence generated content on the object or person (e.g., content generated by providing the detected object or person as a prompt to a large language model), an advertisement related to the object or person, etc.

In some examples, the customized content can be configured to allow for user-interaction with the customized content. For example, the customized content can include a hyperlink selectable to access a related webpage. In another example, the customized content can include a user-input field (e.g., a text box or voice entry field) that can be used to request tailored additional information on the object or person detected in the paused frame. Overall, the technology described herein can allow for an enriched and potentially interactive user-experience by leveraging paused video frames to deliver customized content.

Figure 1:
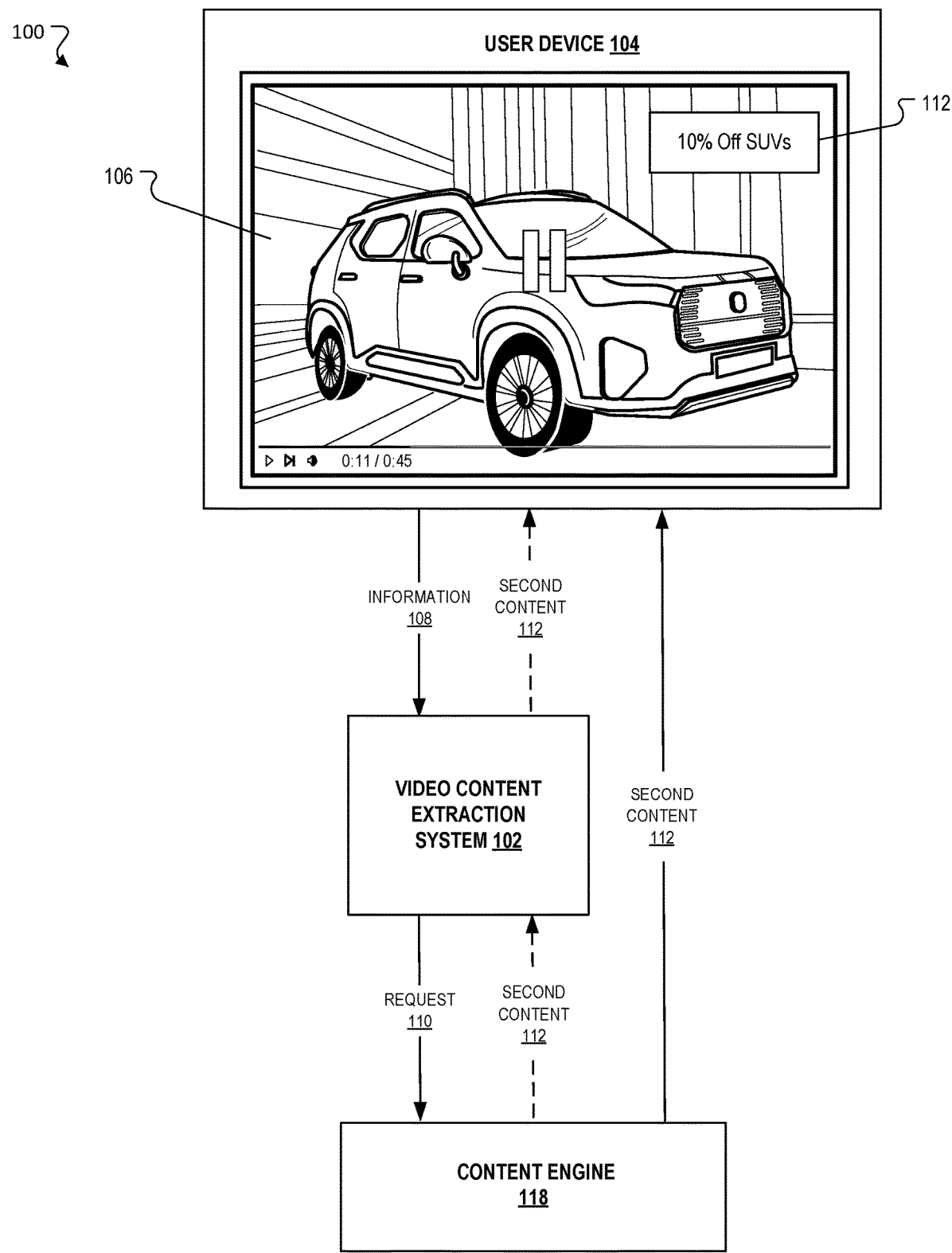
FIG. 1 is a block diagram of an example system that processes information from a paused frame of a video to generate contextual content in accordance with technology described herein.

FIG. 1 is a block diagram of an example system that processes information from a paused frame of a video to generate contextual content. The system 100 includes a user device 104, a video content extraction system 102, and a content engine 118. In general, the system 100 is configured to process information from the user device 104 to generate the contextual content.

The user device 104 can be configured display a video stream. For example, the user device 104 can be a mobile device such as a mobile phone or tablet configured to present a video stream on a display associated the user device 104. In some implementations, the user device 104 can be a computing device such as a laptop, a desktop, a workstation, or a personal digital assistant. In some implementations, the user device 104 can be a video streaming device such as a set top box or an over-the-top (OTT) device that can be connected to an external display device such as a television to display video content. The user device 104 can allow various user interactions with the video content. In some examples, the user can pause the video stream at a particular frame (e.g., the paused screen or frame 106).

In some cases, a user may pause a video stream at a particular frame based on the content (e.g., a vehicle, clothing, person, object, etc.) displayed on the video stream. For example, the user may pause the video stream to inspect the vehicle shown in the paused screen 106. In such cases, the user device 104 can be configured to determine, for example, if the video stream has been paused based on user-interest in the content of the paused frame, and/or potential contents in the paused screen that may have prompted the user to pause the video stream. Accordingly, additional content can be displayed based on the content of the paused frame.

The user device can be configured to determine if the video stream has been paused based on user-interest in the content of the paused screen in various ways. In some implementations, the user device 104 can be configured to determine that the video stream has been paused based on user-interest in the content of the paused frame based on, for example, whether the user has paused the video stream for a at least a threshold duration. The threshold duration can be configured by the system, for example, based on usage statistics pertaining to particular users. For example, the system can determine the threshold duration based on past sessions during which a particular user has paused a video stream for a certain duration (e.g., the threshold duration is greater than the average duration of the past sessions).

Based on the detecting that the video stream has been paused for at least the threshold duration, the user device 104 can send information 108 to a video content extraction system 102 to generate a request 110 for the second content 112. In some examples, the user may have paused the video stream randomly (e.g., not based on the user-interest in the content of the paused frame), and the user device may detect that the video stream has not been paused for the threshold duration. In this case, the system can refrain from sending the information 108 to the video content extraction system 102.

In general, the video content extraction system 102 is configured to request content from the content engine 118 to display on the user device 104 by processing the information 108. In particular, the information 108 can be information indicative of the content of the paused screen 106 (also referred to herein as first content) associated with the paused screen 106. In some examples, the information 108 can be an image file that captures the content of the paused screen 106. In some other examples, the information 108 can be a text file that describes the content of the paused screen 106, such as a JavaScript Object Notation (JSON) file. For example, the image file or the text file of information 108 can include information identifying an object, a person, or both in the paused screen 106, as described in further detail with reference to FIG. 2. The request 110 can be configured to initiate a process of generating additional content being provided to the user device 104 based on content of the paused screen 106. For example, in response to the video content extraction system 102 generating the request 110, additional content (also referred to herein as the second content 112) associated with the content on the paused frame can be provided to the user device 104.

The second content 112 provided to the user device 104 can be displayed on the user device 104, and the second content 112 can be customized content generated by processing the request 110. The second content 112 can include, for example, content that includes additional information on an object or person identified in the paused screen 106, artificial intelligence generated content based on identified objects or people in the paused screen 106 by processing the information 108, or an advertisement related to the identified objects or people. For example, the second content 112 can be generated by providing information associated with the detected objects or people as a prompt to a large language model as part of the request 110.

In some other examples, the second content 112 can be interactive content that a user can interact with (e.g., by clicking on the second content 112) based on the second content 112 being displayed on the user device 104. In particular, the second content 112 can be a text box, a voice input, or an interactive image that can be configured to accept user-input pertaining to the second content 112. For example, once a user pauses at a frame of a video stream on the user device 104, a text box or a voice input can appear next to one or more objects identified by the video content extraction system 102 as of potential interest to the user for the user to select the appropriate one and/or provide additional query to facilitate fetching of more relevant information.

In some other examples, the video content extraction system 102 can select the second content 112 from multiple customized contents based on the request 110. The video content extraction system 102 can select the second content 112 based on how suitable the second content is to present on the user device 104 based on the information 108.

The video content extraction system 102 is a system configured to process the information 108 to generate a request 110. In particular, the video content extraction system 102 can identify one or more objects (e.g., the vehicle shown in the paused screen 106) represented in the first content associated with the paused screen 106 to generate the request 110; as described in further detail below with reference to FIG. 2. The request 110 is a request for the second content 112.

The video content extraction system 102 can send the request 110 to a content engine 118. The content engine 118 is a collection of data: stored on storage devices in one or more locations.

The content engine can process the request 110 to generate second content 112. The content engine 118 can be a device or a repository, such as a storage device, that can be accessed by the video content extraction system 102 to generate the second content 112. In particular, the content engine 118 can be a passive repository or passive database that the video content extraction system 102 can access to retrieve information (e.g., the second content 112) and provide the second content 112 to the user device 104. In some other examples, the content engine 118 can be an Internet repository, such as Wikipedia or IMDB.

In some other examples, the content engine 118 can be an artificial intelligence engine powered by generative artificial intelligence trained to generate content based on processing the request 110 as a prompt. In some other examples, the content engine 118 can be a content server, such as an advertisement server, that is configured to generate content, such as advertisements, based on processing the request 110.

The content engine 118 can provide the second content 112 for presentation on the user device 104. The second content 112 is configured to be presented on the user device 104. The content engine can generate the second content 112 based on a user profile associated with the user device 104. The second content 112 can be a media file of customized content based on the paused screen 106.

The user device 104 can display the second content 112. The second content 112 can be a customized digital component. In particular, the customized digital content can be overlaid on the paused screen 106. For example, the video content extraction system 102 can process information 108 based on the paused screen 106 that includes information of the displayed vehicle, and the video content extractions system 102 can identify the vehicle as an object of interest as part of the request 110 provided to the content engine 118. The content engine 118 can generate the second content 112 based on the request 110, and the second content 112 can be based on the vehicle of the paused screen 106. For example, the second content 112 can include customized content provided by the content engine 118, such as a seller or a vendor for a same or similar vehicle as the vehicle identified as an object of interest. In this case, the second content 112 can include an offer provided the vendor (e.g., "10% Off SUVs).

In some examples, the user associated with the user device 104 can interact (e.g., select) the second content 112 using one or more devices coupled to the user device 104. For example, the user can click the second content 112 using a computer mouse. The user device 104 can display a webpage based on an indication of the user interaction with the second content. For example, the user can click on the second content 112, and the user device can display a webpage associated with the vehicle.

Figure 2:
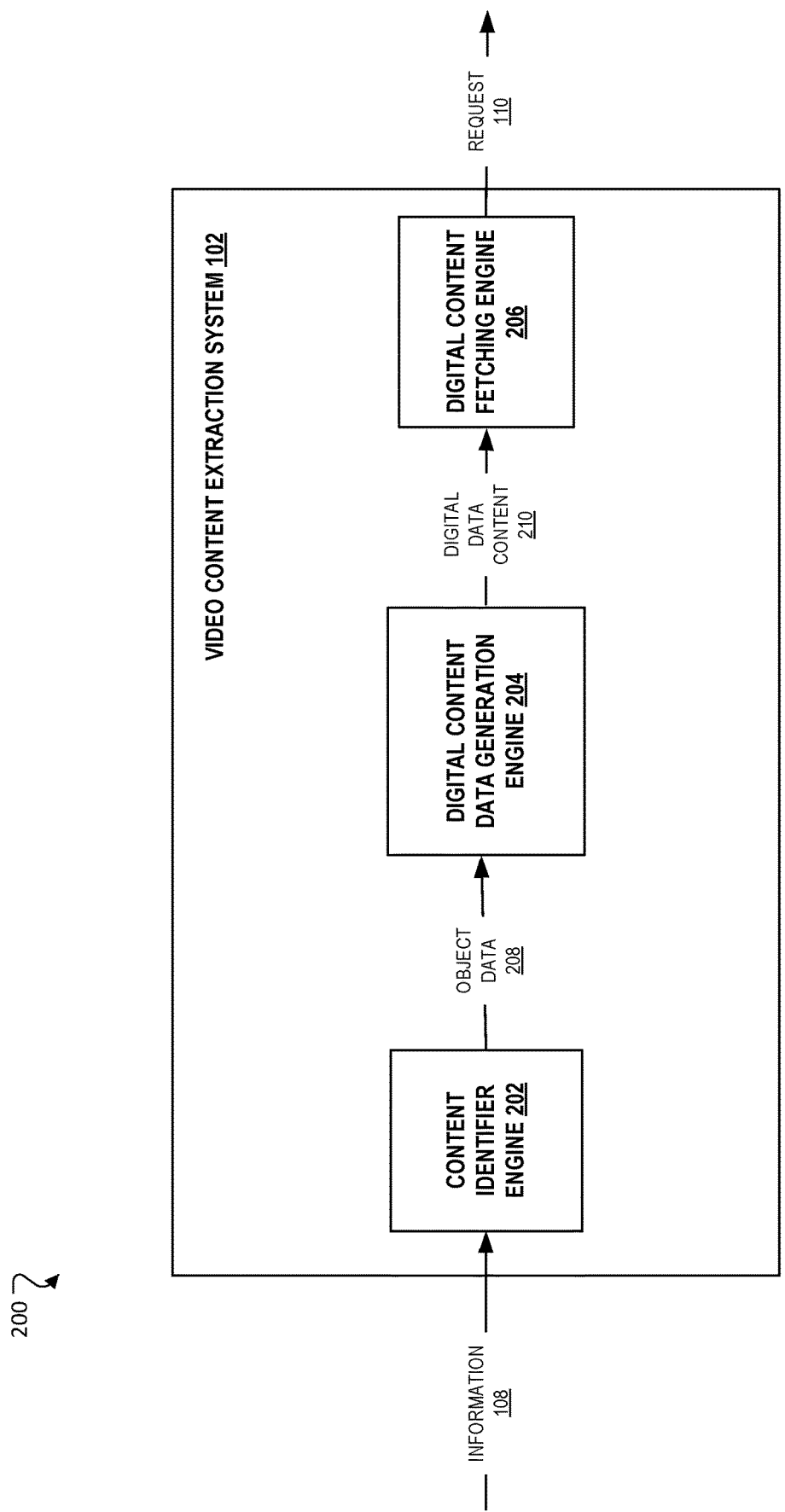
FIG. 2 shows an example of a video content extraction system shown in FIG. 1.

FIG. 2 shows an example of a video content extraction system 102 described above with reference to FIG. 1. The video content extraction system 102 includes a content identifier engine 202, a digital content data generation engine 204, and a digital content fetching engine 206. The content identifier engine 202, the digital content data generation 204, and the digital content fetching engine 206 can be implemented as hardware modules, software modules, or a combination thereof. While the content identifier engine 202, the digital content data generation 204, and the digital content fetching engine 206 are described and depicted as separate modules, the functionalities can be combined into fewer modules.

The video content extraction system 102 can identify one or more objects represented in the information 108 associated with the paused screen 106 to generate the request 110. For example, the system processes the information 108 using the content identifier engine 202. The content identifier engine 202 is configured to process the information 108 to generate object data 208. In some examples, the content identifier engine 202 can include one or more machine learning models, such as deep convolutional neural networks, for generating the object data 208. The one or more machine learning models are configured to generate the object data 208 by identifying objects in the information 108 and context information associated with the objects.

In particular, the content identifier engine 202 identifies objects in the information 108 to generate the object data 208. The object data 208 is data corresponding to one or more identified objects based on processing the information 108. In some examples, the system may not identify any objects in the paused screen 106, and the system may determine that the pause of the video stream by the user is a random pause, rather than an intentional pause to inspect the paused screen 106.

In some implementations, the object data 208 includes context information for each identified object (e.g., each identified object in the paused screen 106). The context information identifies data on the whole with respect to the paused screen. In particular, the context information includes information about multiple features from the paused screen, including timing and minute information.

For example, if the paused screen captures an image of a person standing in front of an object (e.g., a car), the context information can include an identification, a name of the object, a color of the object, or a physical condition of the object. In particular, the object data 208 can be in the format of a text file (e.g., a JSON file). In some examples, the text file can include information about each identified object including an object identification number and an object name. In some examples, the information about the identified object can include an object color, an object condition, or both. For example, the text file can include "id=1, object=car, color=white, and condition=Healthy." In some other examples, the information about the identified object can include an object brand, an object quality, or both. In some other examples, the information can include information about the person standing in front of the object (e.g., accessories such as clothes or shoes).

In some other examples, the information about the identified object can correspond to a person, and the information can include a gender, an indication of whether the person is a celebrity, or both. For example, the text file can include "id=2, object=human, gender=male, and celebrity=false."

In some implementations, the context information can also include a corresponding clarity score for each object. In particular, the content identifier engine 202 identifies a corresponding clarity score for each of the one or more objects based on how clear the object is in the paused screen 106 based on a resolution, a sharpness, or both.

In some implementations, the context information can include a corresponding center score for each object. In particular, the content identifier engine 202 identifies a corresponding center score for each of the one or more objects. The center score is based on distance of the object from the center of the paused screen 106.

In some examples, the context information can include information indicative of one or more associations between the particular object and other identified objects. In particular, the content identifier engine 202 can also determine one or more associations between the particular object and at least another of the one or more objects. The associations can include relationships or actions between objects. For example, if a person were shown in the vehicle of paused screen 106, the object data 208 can include a context information includes information of the relationship between the person and the vehicle (e.g., "driver") and an action (e.g., "drive").

The content identifier engine 202 can be configured to provide the object data 208 to the digital content data generation engine 204, and the digital content data generation engine 204 can process the object data 208 to generate digital data content 210. The digital data content includes an indication of a central context information of the paused screen 106. The central context information is a subset of the context information that the system can use to generate the request for the customized content.

In particular, for each of the identified objects in the object data 208, the digital content data generation engine 204 can determine whether the center score of the object satisfies a threshold. If none of the objects satisfy the threshold, the digital content data generation engine 204 refrains from generating the digital data content 210, and the system refrains from generating the request 110 for the second content 112. The digital content fetching engine 206 can be configured to process the digital data content 210 to generate the request 110. The request 110 is a request for the second content 112 from the content engine 118 based on the digital data content 210. In some examples, the digital content fetching engine 206 can also process information associated with the user device, such as a channel or a type of device.

The content engine 118 can be configured to fetch the second content 112 based on the request 110, and the system can present the second content 112 to the user device 104. In some examples, the content engine 118 can store the central context information for the particular object as part of the digital data content 210, and the content engine 118 can generate the second content 112 based on the digital data content 210. In some examples, the content engine 118 can generate the second content 112 in real time based on the digital data content 210 being linked to a user profile associated with the user device 104. In particular, the content engine 118 generates the second content 112 on the fly based on the request 110 and the digital data content 210. In some examples, the video content extraction system 102 can receive the second content 112, and the second content 112 can include multiple customized digital components. In this case, the video content extraction system 102 can select a customized digital component of the multiple customized digital components based on a likelihood that the user will interact with the customized digital component, and the video content extraction system 102 can present the selected customized digital component to the user device 104 as the second content 112.

The second content 112 can be customized content generated by processing the request 110. The second content 112 can include, for example, content that includes additional information on the identified objects, artificial intelligence generated content based on the identified objects, or an advertisement related to the identified objects. For example, the second content 112 can be generated by providing information associated with the identified as a prompt to a large language model as part of the request 110.

In some other examples, the second content 112 can be interactive content that a user can interact with based on the second content 112 being displayed on the user device 104. In particular, the second content 112 can be a text box, a voice input, or an image input that can be configured to accept user-input to edit the second content 112.

Figure 3:
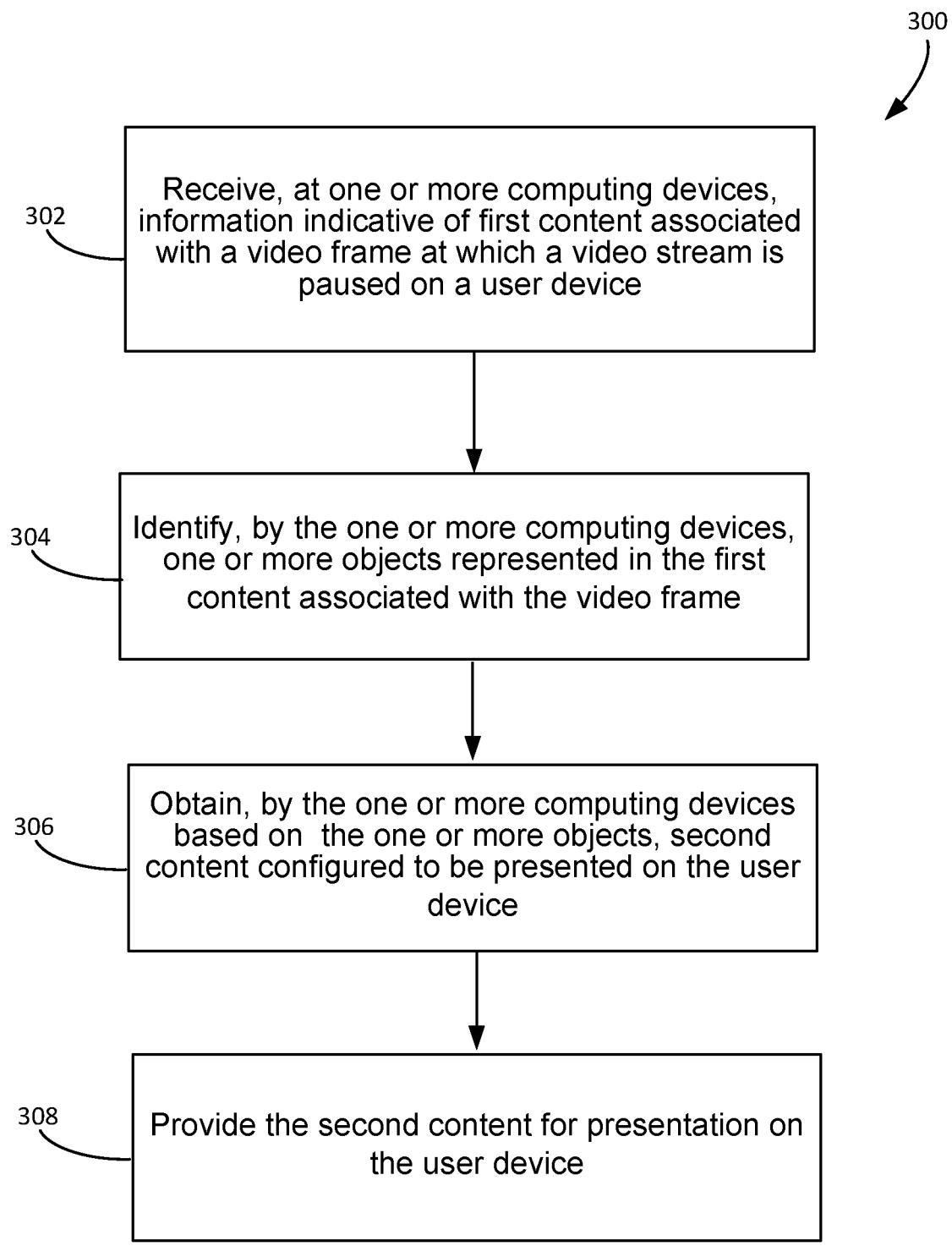
FIG. 3 is a flow diagram of an example process for processing information of a paused screen of a video to generate contextual content.

FIG. 3 is a flow diagram of an example process 300 for processing information of a paused screen of a video to generate contextual content. For convenience, the process 300 will be described as being performed by a system of one or more computers, located in one or more locations, and programmed appropriately in accordance with this specification. For example, a system, e.g., the system 100 of FIG. 1, appropriately programmed, can perform the process 300.

The system can receive, at one or more computing devices, information indicative of first content associated with a video frame at which a video stream is paused on a user device (302). The first content can be information about the paused frame (e.g., the paused video frame), including information about objects in the paused frame.

The system can identify, by the one or more computing devices, one or more objects represented in the first content associated with the video frame (304). For example, the objects can be people or items. In particular, the system can identify a corresponding center score for each of the one or more objects. The center score is indicative of a distance of the corresponding object from the center of the video frame.

The system can determine, for a particular object of the one or more objects, that a corresponding center score satisfies a threshold, and, in response, determining a context (e.g. context information) for the particular object. In particular, the system can determine the context information for the particular object by determining one or more associations between the particular object and at least another one or more objects and by generating the context information based on the particular object and the one or more associations.

In some examples, the context information includes a respective clarity score that defines a clarity (e.g., a resolution metric) of the one or more objects. For example, the system can determine a clarity score for each of the one or more objects, and the system can include the clarity score when generating the context information for a particular object. The system can store the context information for the particular object linked to a user profile associated with the user device The system can obtain, by the one or more computing devices based on the one or more objects, second content configured to be presented on the user device (306). The second content provided to the user device can be displayed on the user device, and the second content can be customized content generated by processing the request. The second content can include, for example, content that includes additional information on an object or person identified in the paused frame, artificial intelligence generated content based on identified objects or people in the paused frame by processing the information 108, or an advertisement related to the identified objects or people.

In some other examples, the second content can be interactive content that a user can interact with. In particular, the second content can be a text box, a voice input, or an image input that can be configured to accept user-input to edit (e.g., tailor) the second content.

The system can send a request based on the one or more objects to a repository of digital content, and, in response, receive the second content from the repository. The repository can be storage device that can be accessed by the system 102 to generate the second content. In particular, the repository can be a passive repository or passive database. In some other examples, the repository can be an Internet repository, such as Wikipedia or IMDB. In some other examples, the repository can be an artificial intelligence engine powered by generative artificial intelligence trained to generate content based on processing the request as a prompt. In some other examples, the repository can be a content server, such as an advertisement server, that is configured to generate content, such as advertisements, based on processing the request.

In particular, the second content is generated based on a user profile associated with the user device. In some examples, the system may determine that the video stream has been paused for a duration that satisfies a threshold duration, and based on the duration satisfying the threshold duration, the system can obtain the second content.

The system can provide the second content for presentation on the user device (308). The second content is generated based on a user profile associated with the user device. In particular, the system can display the second content on the user device. In this case, the system can display the second content on the user device overlayed on the paused screen for a certain amount of time.

In some examples, the system can receive information indicative of a user interaction with the second content, and the system can display a webpage on the user device based on the information indicative of the user interaction with the second content. For example, if a user clicks (e.g., selects) the second content using one or more devices coupled with the user device, the system can receive information indicative of the selection and display a webpage associated with the second content.

Figure 4:
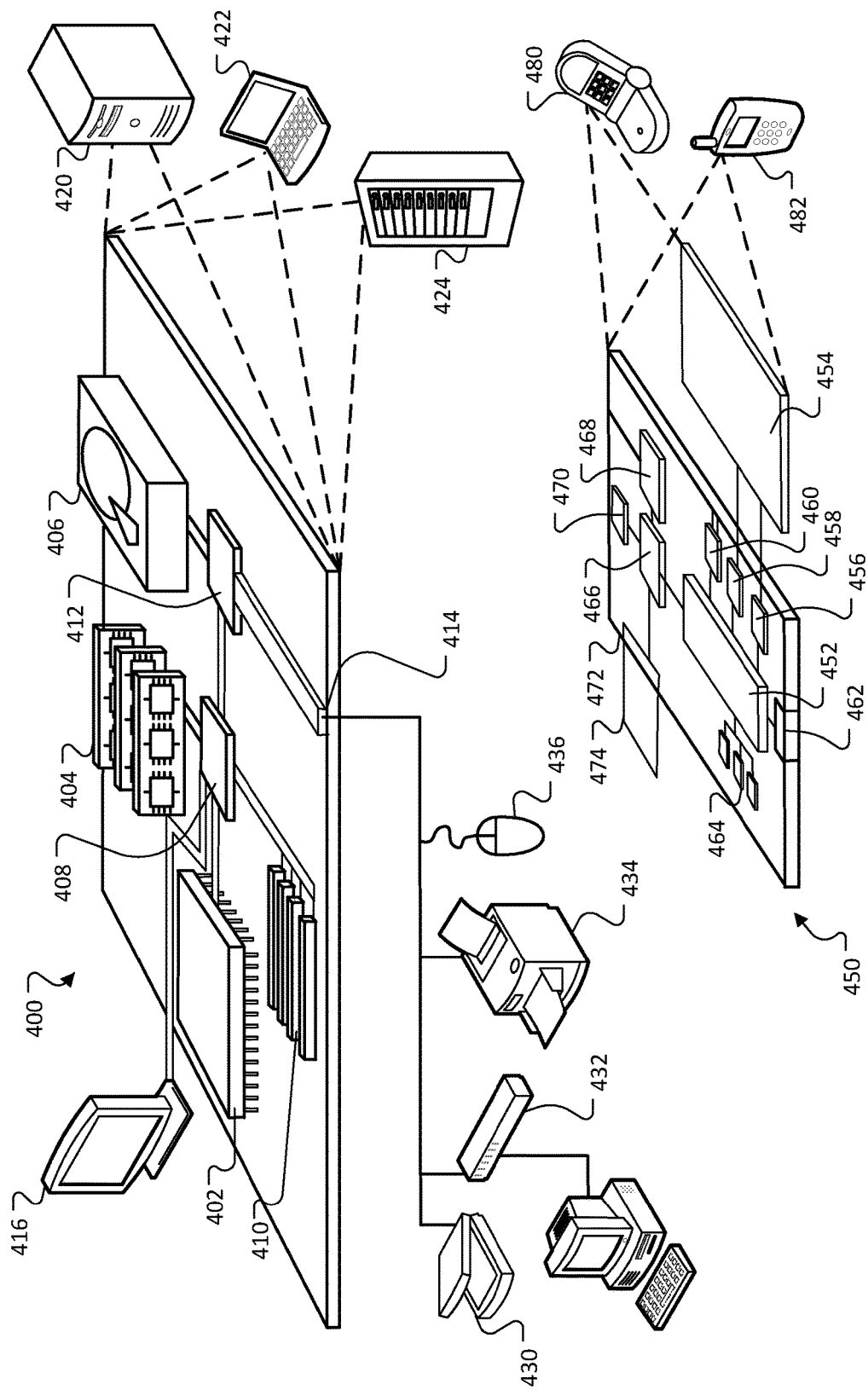
FIG. 4 is a block diagram of a computing system that can be used in connection with computer-implemented methods described in this specification.

FIG. 4 shows an example of a computing device 400 and a mobile computing device 450 (also referred to herein as a wireless device) that are employed to execute implementations of the present disclosure. The computing device 400 is intended to represent various forms of digital computers, such as laptops, desktops, workstations, personal digital assistants, servers, blade servers, mainframes, and other appropriate computers. The mobile computing device 450 is intended to represent various forms of mobile devices, such as personal digital assistants, cellular telephones, smartphones, AR devices, and other similar computing devices. The components shown here, their connections and relationships, and their functions, are meant to be examples only, and are not meant to be limiting. The computing device 400 and/or the mobile computing device 450 can form at least a portion of the application installation environment described above. For example, a computing device 400, or a portion thereof, can be used to implement the mobile service platform 120, the registration portal 130, and/or the SIM profile repository 140. The user device 104 described with reference to FIG. 1 can be substantially similar to the mobile computing device 450.

The computing device 400 includes a processor 402, a memory 404, a storage device 406, a high-speed interface 408, and a low-speed interface 412. In some implementations, the high-speed interface 408 connects to the memory 404 and multiple high-speed expansion ports 410. In some implementations, the low-speed interface 412 connects to a low-speed expansion port 414 and the storage device 404. Each of the processor 402, the memory 404, the storage device 406, the high-speed interface 408, the high-speed expansion ports 410, and the low-speed interface 412, are interconnected using various buses, and may be mounted on a common motherboard or in other manners as appropriate. The processor 402 can process instructions for execution within the computing device 400, including instructions stored in the memory 404 and/or on the storage device 406 to display graphical information for a graphical user interface (GUI) on an external input/output device, such as a display 416 coupled to the high-speed interface 408. In other implementations, multiple processors and/or multiple buses may be used, as appropriate, along with multiple memories and types of memory. In addition, multiple computing devices may be connected, with each device providing portions of the necessary operations (e.g., as a server bank, a group of blade servers, or a multi-processor system).

The memory 404 stores information within the computing device 400. In some implementations, the memory 404 is a volatile memory unit or units. In some implementations, the memory 404 is a non-volatile memory unit or units. The memory 404 may also be another form of a computer-readable medium, such as a magnetic or optical disk.

The storage device 406 is capable of providing mass storage for the computing device 400. In some implementations, the storage device 406 may be or include a computer-readable medium, such as a floppy disk device, a hard disk device, an optical disk device, a tape device, a flash memory, or other similar solid-state memory device, or an array of devices, including devices in a storage area network or other configurations. Instructions can be stored in an information carrier. The instructions, when executed by one or more processing devices, such as processor 402, perform one or more methods, such as those described above. The instructions can also be stored by one or more storage devices, such as computer-readable or machine-readable mediums, such as the memory 404, the storage device 406, or memory on the processor 402.

The high-speed interface 408 manages bandwidth-intensive operations for the computing device 400, while the low-speed interface 412 manages lower bandwidth-intensive operations. Such allocation of functions is an example only. In some implementations, the high-speed interface 408 is coupled to the memory 404, the display 416 (e.g., through a graphics processor or accelerator), and to the high-speed expansion ports 410, which may accept various expansion cards. In the implementation, the low-speed interface 412 is coupled to the storage device 406 and the low-speed expansion port 414. The low-speed expansion port 414, which may include various communication ports (e.g., Universal Serial Bus (USB), Bluetooth, Ethernet, wireless Ethernet) may be coupled to one or more input/output devices. Such input/output devices may include a scanner, a printing device, or a keyboard or mouse. The input/output devices may also be coupled to the low-speed expansion port 414 through a network adapter. Such network input/output devices may include, for example, a switch or router.

The computing device 400 may be implemented in a number of different forms, as shown in the FIG. 4. For example, it may be implemented as a standard server 420, or multiple times in a group of such servers. In addition, it may be implemented in a personal computer such as a laptop computer 422. It may also be implemented as part of a rack server system 424. Alternatively, components from the computing device 400 may be combined with other components in a mobile device, such as a mobile computing device 450. Each of such devices may contain one or more of the computing device 400 and the mobile computing device 450, and an entire system may be made up of multiple computing devices communicating with each other.

The mobile computing device 450 includes a processor 452; a memory 464; an input/output device, such as a display 454; a communication interface 466; and a transceiver 468; among other components. The mobile computing device 450 may also be provided with a storage device, such as a micro-drive or other device, to provide additional storage. Each of the processor 452, the memory 464, the display 454, the communication interface 466, and the transceiver 468, are interconnected using various buses, and several of the components may be mounted on a common motherboard or in other manners as appropriate. In some implementations, the mobile computing device 450 may include a camera device(s) (not shown).

The processor 452 can execute instructions within the mobile computing device 450, including instructions stored in the memory 464. The processor 452 may be implemented as a chipset of chips that include separate and multiple analog and digital processors. For example, the processor 452 may be a Complex Instruction Set Computers (CISC) processor, a Reduced Instruction Set Computer (RISC) processor, or a Minimal Instruction Set Computer (MISC) processor. The processor 452 may provide, for example, for coordination of the other components of the mobile computing device 450, such as control of user interfaces (UIs), applications run by the mobile computing device 450, and/or wireless communication by the mobile computing device 450.

The processor 452 may communicate with a user through a control interface 458 and a display interface 456 coupled to the display 454. The display 454 may be, for example, a Thin-Film-Transistor Liquid Crystal Display (TFT) display, an Organic Light Emitting Diode (OLED) display, or other appropriate display technology. The display interface 456 may include appropriate circuitry for driving the display 454 to present graphical and other information to a user. The control interface 458 may receive commands from a user and convert them for submission to the processor 452. In addition, an external interface 462 may provide communication with the processor 452, so as to enable near area communication of the mobile computing device 450 with other devices. The external interface 462 may provide, for example, for wired communication in some implementations, or for wireless communication in other implementations, and multiple interfaces may also be used.

The memory 464 stores information within the mobile computing device 450. The memory 464 can be implemented as one or more of a computer-readable medium or media, a volatile memory unit or units, or a non-volatile memory unit or units. An expansion memory 474 may also be provided and connected to the mobile computing device 450 through an expansion interface 472, which may include, for example, a Single in Line Memory Module (SIMM) card interface. The expansion memory 474 may provide extra storage space for the mobile computing device 450, or may also store applications or other information for the mobile computing device 450. Specifically, the expansion memory 474 may include instructions to carry out or supplement the processes described above, and may include secure information also. Thus, for example, the expansion memory 474 may be provided as a security module for the mobile computing device 450, and may be programmed with instructions that permit secure use of the mobile computing device 450. In addition, secure applications may be provided via the SIMM cards, along with additional information, such as placing identifying information on the SIMM card in a non-hackable manner.

The memory may include, for example, flash memory and/or non-volatile random access memory (NVRAM), as discussed below. In some implementations, instructions are stored in an information carrier. The instructions, when executed by one or more processing devices, such as processor 452, perform one or more methods, such as those described above. The instructions can also be stored by one or more storage devices, such as one or more computer-readable or machine-readable mediums, such as the memory 464, the expansion memory 474, or memory on the processor 452. In some implementations, the instructions can be received in a propagated signal, such as, over the transceiver 468 or the external interface 462.

The mobile computing device 450 may communicate wirelessly through the communication interface 466, which may include digital signal processing circuitry where necessary. The communication interface 466 may provide for communications under various modes or protocols, such as Global System for Mobile communications (GSM) voice calls, Short Message Service (SMS), Enhanced Messaging Service (EMS), Multimedia Messaging Service (MMS) messaging, code division multiple access (CDMA), time division multiple access (TDMA), Personal Digital Cellular (PDC), Wideband Code Division Multiple Access (WCDMA), CDMA2000, General Packet Radio Service (GPRS). Such communication may occur, for example, through the transceiver 468 using a radio frequency. In addition, short-range communication, such as using a Bluetooth or Wi-Fi, may occur. In addition, a Global Positioning System (GPS) receiver module 470 may provide additional navigation- and location-related wireless data to the mobile computing device 450, which may be used as appropriate by applications running on the mobile computing device 450.

The mobile computing device 450 may also communicate audibly using an audio codec 460, which may receive spoken information from a user and convert it to usable digital information. The audio codec 460 may likewise generate audible sound for a user, such as through a speaker, e.g., in a handset of the mobile computing device 450. Such sound may include sound from voice telephone calls, may include recorded sound (e.g., voice messages, music files, etc.) and may also include sound generated by applications operating on the mobile computing device 450.

The mobile computing device 450 may be implemented in a number of different forms, as shown in FIG. 4. For example, it may be implemented in the mobile device described with respect to FIGS. 1-3. Other implementations may include a phone device 482 and a tablet device 484. The mobile computing device 450 may also be implemented as a component of a smart-phone, personal digital assistant, AR device, or other similar mobile device.

Computing device 400 and/or 450 can also include USB flash drives. The USB flash drives may store operating systems and other applications. The USB flash drives can include input/output components, such as a wireless transmitter or USB connector that may be inserted into a USB port of another computing device.

A number of implementations have been described. Nevertheless, it will be understood that various modifications may be made without departing from the spirit and scope of the disclosure. For example, various forms of the flows shown above may be used, with steps re-ordered, added, or removed.

Embodiments of the subject matter and the actions and operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, e.g., one or more modules of computer program instructions, encoded on a computer program carrier, for execution by, or to control the operation of, data processing apparatus. The carrier may be a tangible non-transitory computer storage medium. Alternatively or in addition, the carrier may be an artificially-generated propagated signal, e.g., a machine-generated electrical, optical, or electromagnetic signal, that is generated to encode information for transmission to suitable receiver apparatus for execution by a data processing apparatus. The computer storage medium can be or be part of a machine-readable storage device, a machine-readable storage substrate, a random or serial access memory device, or a combination of one or more of them. A computer storage medium is not a propagated signal.

The term "data processing apparatus" encompasses all kinds of apparatus, devices, and machines for processing data, including by way of example a programmable processor, a computer, or multiple processors or computers. Data processing apparatus can include special-purpose logic circuitry, e.g., an FPGA (field programmable gate array), an ASIC (application-specific integrated circuit), or a GPU (graphics processing unit). The apparatus can also include, in addition to hardware, code that creates an execution environment for computer programs, e.g., code that constitutes processor firmware, a protocol stack, a database management system, an operating system, or a combination of one or more of them. A computer program can be written in any form of programming language, including compiled or interpreted languages, or declarative or procedural languages; and it can be deployed on a system of one or more computers in any form, including as a stand-alone program, e.g., as an app, or as a module, component, engine, subroutine, or other unit suitable for executing in a computing environment, which environment may include one or more computers interconnected by a data communication network in one or more locations.

A computer program may, but need not, correspond to a file in a file system. A computer program can be stored in a portion of a file that holds other programs or data, e.g., one or more scripts stored in a markup language document, in a single file dedicated to the program in question, or in multiple coordinated files, e.g., files that store one or more modules, sub-programs, or portions of code.

The processes and logic flows described in this specification can be performed by one or more computers executing one or more computer programs to perform operations by operating on input data and generating output. The processes and logic flows can also be performed by special-purpose logic circuitry, e.g., an FPGA, an ASIC, or a GPU, or by a combination of special-purpose logic circuitry and one or more programmed computers.

Computers suitable for the execution of a computer program can be based on general or special-purpose microprocessors or both, or any other kind of central processing unit. Generally, a central processing unit will receive instructions and data from a read-only memory or a random access memory or both. The essential elements of a computer are a central processing unit for executing instructions and one or more memory devices for storing instructions and data. The central processing unit and the memory can be supplemented by, or incorporated in, special-purpose logic circuitry.

Generally, a computer will also include, or be operatively coupled to, one or more mass storage devices, and be configured to receive data from or transfer data to the mass storage devices. The mass storage devices can be, for example, magnetic, magneto-optical, or optical disks, or solid state drives. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

To provide for interaction with a user, embodiments of the subject matter described in this specification can be implemented on one or more computers having, or configured to communicate with, a display device, e.g., a LCD (liquid crystal display) or organic light-emitting diode (OLED) monitor, a virtual-reality (VR) or augmented-reality (AR) display, for displaying information to the user, and an input device by which the user can provide input to the computer, e.g., a keyboard and a pointing device, e.g., a mouse, a trackball or touchpad. Other kinds of devices can be used to provide for interaction with a user as well; for example, feedback and responses provided to the user can be any form of sensory feedback, e.g., visual, auditory, speech or tactile; and input from the user can be received in any form, including acoustic, speech, or tactile input, including touch motion or gestures, or kinetic motion or gestures or orientation motion or gestures. In addition, a computer can interact with a user by sending documents to and receiving documents from a device that is used by the user; for example, by sending web pages to a web browser on a user's device in response to requests received from the web browser, or by interacting with an app running on a user device, e.g., a smartphone or electronic tablet. Also, a computer can interact with a user by sending text messages or other forms of message to a personal device, e.g., a smartphone that is running a messaging application, and receiving responsive messages from the user in return.

This specification uses the term "configured to" in connection with systems, apparatus, and computer program components. That a system of one or more computers is configured to perform particular operations or actions means that the system has installed on it software, firmware, hardware, or a combination of them that in operation cause the system to perform the operations or actions. That one or more computer programs is configured to perform particular operations or actions means that the one or more programs include instructions that, when executed by data processing apparatus, cause the apparatus to perform the operations or actions. That special-purpose logic circuitry is configured to perform particular operations or actions means that the circuitry has electronic logic that performs the operations or actions.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of what is being claimed, which is defined by the claims themselves, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claim may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method comprising:
receiving, at one or more computing devices, information indicative of first content associated with a video frame at which a video stream is paused on a user device;
identifying, by the one or more computing devices, one or more objects represented in the first content associated with the video frame, wherein the identifying comprises:
identifying a corresponding center score for each of the one or more objects, wherein the center score is indicative of distance of the corresponding object from the center of the video frame;
determining, for a particular object of the one or more objects, that the corresponding center score satisfies a threshold;
in response to determining that the corresponding center score satisfies the threshold, determining a context for the particular object; and
storing the context linked to a user profile associated with the user device;
obtaining, by the one or more computing devices based on the one or more objects and the context for at least one of the one or more objects, second content configured to be presented on the user device; and
providing the second content for presentation on the user device.

2. The method of claim 1, wherein obtaining the second content further comprises:
sending a request based on the one or more objects to a repository of digital content; and
in response, receiving, from the repository, the second content.

3. The method of claim 2, wherein the second content is generated based on the user profile associated with the user device.

4. The method of claim 1, wherein determining the context further comprises:
determining one or more associations between the particular object and at least another of the one or more objects; and
generating the context based on the particular object and the one or more associations.

5. The method of claim 1, wherein the context further comprises a respective clarity score that defines a clarity of the one or more objects.

6. The method of claim 1, wherein providing the second content for presentation on the user device further comprises:
displaying the second content on the user device.

7. The method of claim 6, further comprising:
receiving information indicative of user interaction with the second content; and
displaying a webpage based on the information indicative of the user interaction with the second content.

8. The method of claim 1, wherein obtaining the second content comprises:
determining that the video stream has been paused for a duration that satisfies a threshold duration; and
obtaining the second content responsive to determining that the video stream has been paused for the duration that satisfies the threshold duration.

9. One or more non-transitory computer storage media encoded with computer program instructions that when executed by one or more computing devices, cause the one or more computing devices to perform operations comprising:
receiving information indicative of first content associated with a video frame at which a video stream is paused on a user device;

identifying one or more objects represented in the first content associated with the video frame, wherein the identifying comprises:
  identifying a corresponding center score for each of the one or more objects, wherein the center score is indicative of distance of the corresponding object from the center of the video frame;
  determining, for a particular object of the one or more objects, that the corresponding center score satisfies a threshold;
  in response to determining that the corresponding center score satisfies the threshold, determining a context for the particular object; and
  storing the context linked to a user profile associated with the user device;
obtaining, based on the one or more objects and the context for at least one of the one or more objects, second content configured to be presented on the user device; and
providing the second content for presentation on the user device.

10. The one or more non-transitory computer storage media of claim 9, wherein obtaining the second content further comprises:
  sending a request based on the one or more objects to a repository of digital content; and
  in response, receiving, from the repository, the second content.

11. The one or more non-transitory computer storage media of claim 10, wherein the second content is generated based on the user profile associated with the user device.

12. A system comprising:
a user device; and
one or more computing devices configured to interact with the user device and to perform operations comprising:
  receiving, at the one or more computing devices, information indicative of first content associated with a video frame at which a video stream is paused on the user device;
  identifying, by the one or more computing devices, one or more objects represented in the first content associated with the video frame, wherein the identifying comprises:
    identifying a corresponding center score for each of the one or more objects, wherein the center score is indicative of distance of the corresponding object from the center of the video frame;
    determining, for a particular object of the one or more objects, that the corresponding center score satisfies a threshold;
    in response to determining that the corresponding center score satisfies the threshold, determining a context for the particular object; and
    storing the context linked to a user profile associated with the user device;
  obtaining, by the one or more computing devices based on the one or more objects and the context for at least one of the one or more objects, second content configured to be presented on the user device; and
  providing the second content for presentation on the user device.

13. The system of claim 12, wherein obtaining the second content further comprises:
  sending a request based on the one or more objects to a repository of digital content; and
  in response, receiving, from the repository, the second content.

14. The system of claim 13, wherein the second content is generated based on the user profile associated with the user device.

15. The one or more non-transitory computer storage media of claim 9, wherein determining the context further comprises:
  determining one or more associations between the particular object and at least another of the one or more objects; and
  generating the context based on the particular object and the one or more associations.

16. The one or more non-transitory computer storage media of claim 9, wherein the context further comprises a respective clarity score that defines a clarity of the one or more objects.

17. The one or more non-transitory computer storage media of claim 9, wherein providing the second content for presentation on the user device further comprises:
  displaying the second content on the user device.

18. The system of claim 13, wherein determining the context further comprises:
  determining one or more associations between the particular object and at least another of the one or more objects; and
  generating the context based on the particular object and the one or more associations.

19. The system of claim 13, wherein the context further comprises a respective clarity score that defines a clarity of the one or more objects.

20. The system of claim 13, wherein providing the second content for presentation on the user device further comprises:
  displaying the second content on the user device.

* * * * *